(No Model.)
J. V. UPINGTON.
SULKY.
No. 262,153. Patented Aug. 1, 1882.
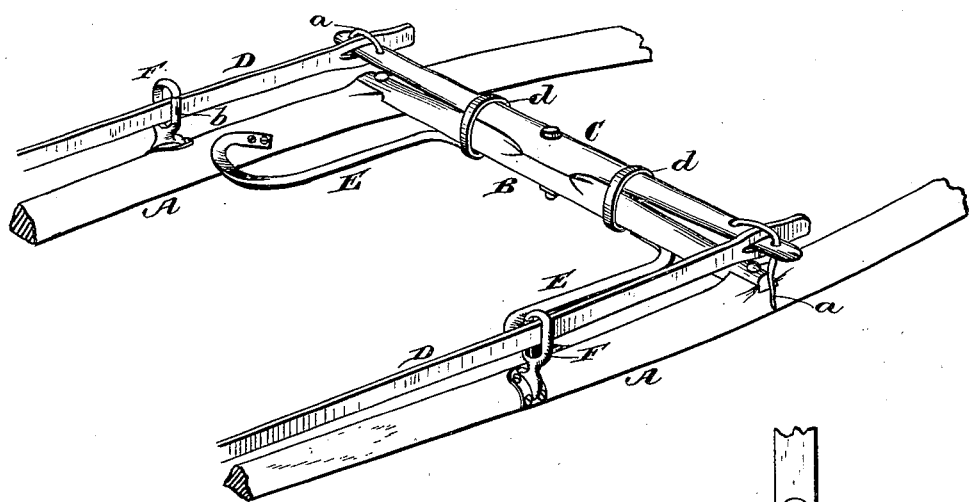
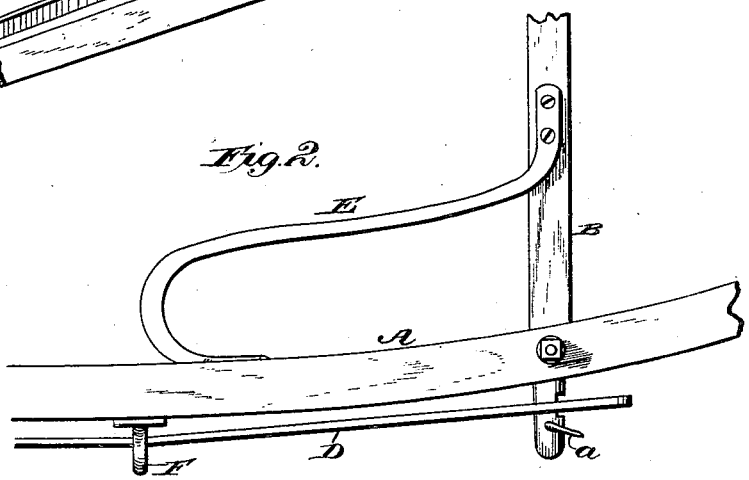
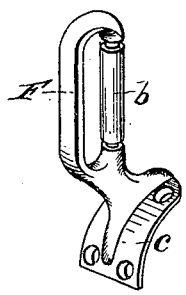
Witnesses.
Robert Everett
J. A. Rutherford
Inventor:
John V. Upington.
By James L. Norris.
Atty.

UNITED STATES PATENT OFFICE.

JOHN V. UPINGTON, OF LEXINGTON, KENTUCKY, ASSIGNOR OF ONE-HALF TO JAMES T. UPINGTON, OF SAME PLACE.

SULKY.

SPECIFICATION forming part of Letters Patent No. 262,153, dated August 1, 1882.

Application filed April 18, 1882. (No model.)

*To all whom it may concern:*

Be it known that I, JOHN V. UPINGTON, a citizen of the United States, residing at Lexington, in the county of Fayette and State of Kentucky, have invented new and useful Improvements in Sulkies, of which the following is a specification.

This invention relates to improvements in trotting-sulkies or other wheeled vehicles, and has for its object to furnish a device which will subserve the purposes of a trace-holder and a foot-guard, whereby the trace will be free to move longitudinally, but will be prevented from chafing the shafts or the driver's feet.

In the accompanying drawings, which fully illustrate my invention, Figure 1 is a perspective view of a portion of a sulky embodying my improvements. Fig. 2 is a bottom plan view of one side. Fig. 3 is a perspective view of my improved trace-holder and foot-guard; and Fig. 4 is a transverse section through one of the shafts, showing a front view of trace-holder, foot-guard, and stirrup-brace.

Like letters indicate like parts in the several views.

The shafts A A are constructed of durable but light material, and may be formed singly or united by a curve or cross brace at the rear in the usual manner. They are connected in front by a cross piece or brace, B, to which is pivoted the whiffletree C. The whiffletree extends on each side beyond the shafts, and carries the traces D D, which are secured thereto by thongs *a a* in the ordinary manner.

The letters E E denote curved stirrup-braces, which are arranged obliquely in front of the cross-piece B in the angles formed by it with the shafts. These braces are secured to the under part of the cross-piece and inner sides of the shafts by means of suitable bolts or equivalent fastenings, and are arranged to afford a firm and convenient support for the feet of the driver.

In order to provide a guard for the foot, and at the same time furnish a support for the trace adapted to prevent it from chafing against the shafts or the side of the driver's boot, I employ a combined guard or holder, F, which may be attached directly to the shaft, or may be formed with or attached to the forward end of the stirrup-brace. This device consists essentially of a loop for the passage of the trace so constructed and arranged as to prevent injury to the shafts and adjoining parts from chafing or frictional contact of the traces. It also acts as a guard to protect and assist in supporting the driver's foot.

The combined guard and trace-holder may be form in any convenient shape, and is constructed partly or entirely of wood, metal, or other suitable material.

If desired, it may be partly or wholly covered with rubber, gutta-percha, or similar substance adapted to permit the traces to work easily and afford an elastic support for the side of the foot. It is also preferably rounded on its inner sides, and provided with one or more vertical rollers, *b*, for a similar purpose, although such rollers may be dispensed with, if desired. Their use, however, enables the traces to run more easily and obviates any liability to rubbing of the boot.

The guard or holder F may be secured to the inner or outer sides of the shaft, as preferred, by means of bolts or screws passing through suitable openings in the oblique curved plate *c*, forming part of its shank. The form of this plate, however, is immaterial, as the guard or holder may be provided with a shank of such shape as to adapt it for ready attachment by any suitable means to shafts of various forms or to the forward curved end of the stirrup-brace. The stirrup-brace E and guard or trace-holder F may also be formed in one piece, capable of being securely arranged to accomplish the purposes above indicated.

By this device the traces are supported in such a manner as to allow them a proper freedom of motion, and yet prevent them from becoming entangled with the driver's foot. The guard or holder, being formed as a closed loop, effectively incloses the trace, and will not allow it to slip out of place. When the loops F are attached to the outer sides of the shafts, as shown in the drawings, the whiffletree will be of such length as to extend on each side beyond the shafts. Its oscillation may be limited, if desired, by straps *d d* in the ordinary manner.

Having thus described my invention, what I claim is—

1. In a sulky, a trace-holder and foot-guard in the form of a loop, arranged, as herein described and shown, to receive the trace and retain it from contact with the shafts and the driver's feet, substantially as set forth 2. In a sulky having stirrup-braces for the driver's feet, a trace-holder in the form of a loop arranged in relation to the said stirrup-braces, as herein described and shown, for the purpose of retaining the traces from contact with the driver's feet and the shafts, substantially as described.

3. A trace-holder and foot-guard composed of a loop provided with one or more rollers, for the purpose of affording a rolling bearing for the trace and at the same time retaining the latter from contact with the driver's feet, substantially as described.

4. The trace-holder and foot-guard F, provided with a roller, b, and a curved base-plate, c, adapted to be attached to the side of the shaft, substantially as described.

In testimony whereof I have hereunto set my hand in the presence of two subscribing witnesses.

JOHN V. UPINGTON.

Witnesses:
LOUIS MYERS,
JAS. E. SHRYOCK.